Sept. 1, 1959 J. E. FOSTER 2,902,640
DETECTION OF STUCK POINT IN WELLS
Filed Dec. 15, 1954 2 Sheets-Sheet 1
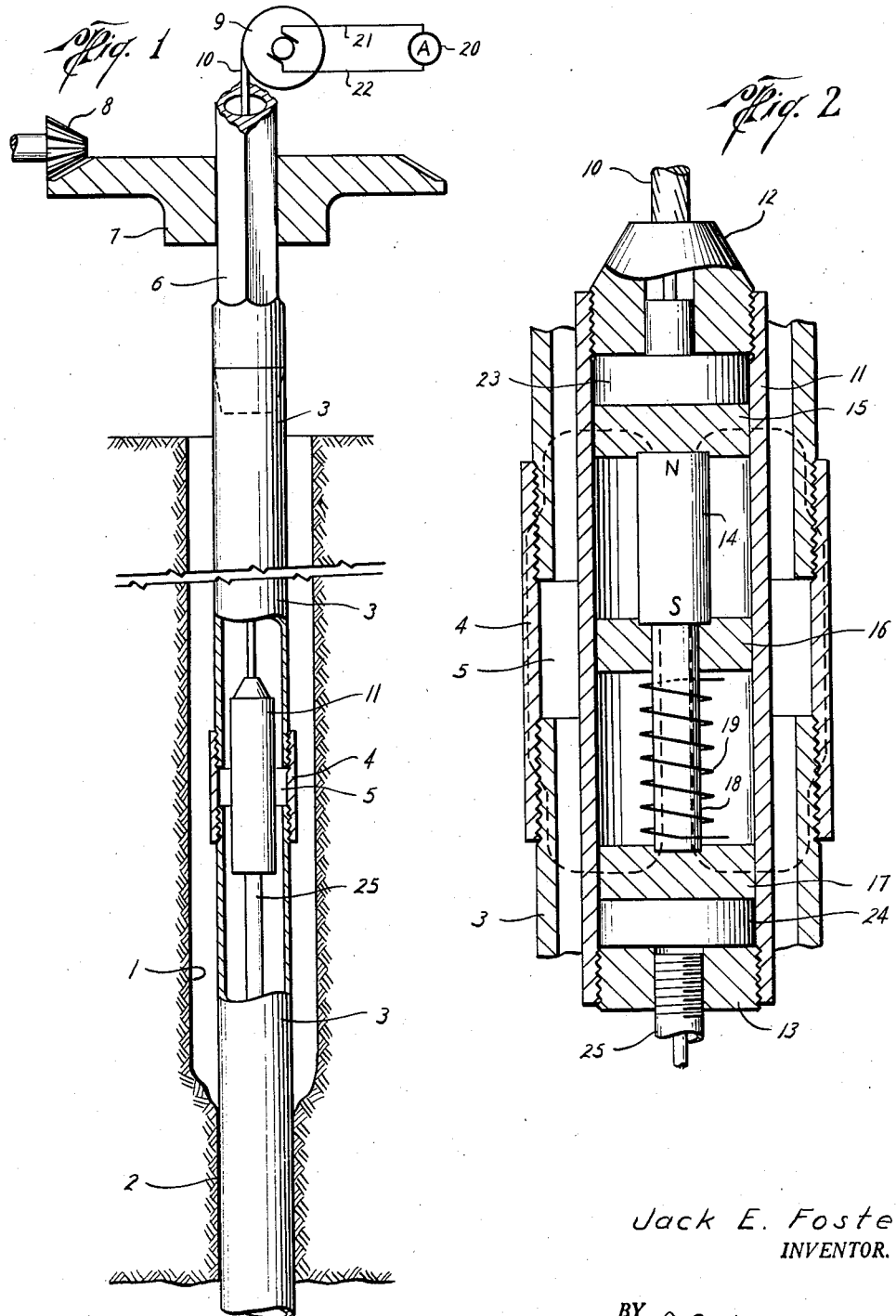
Jack E. Foster
INVENTOR.
BY G.C. Helmig
ATTORNEY

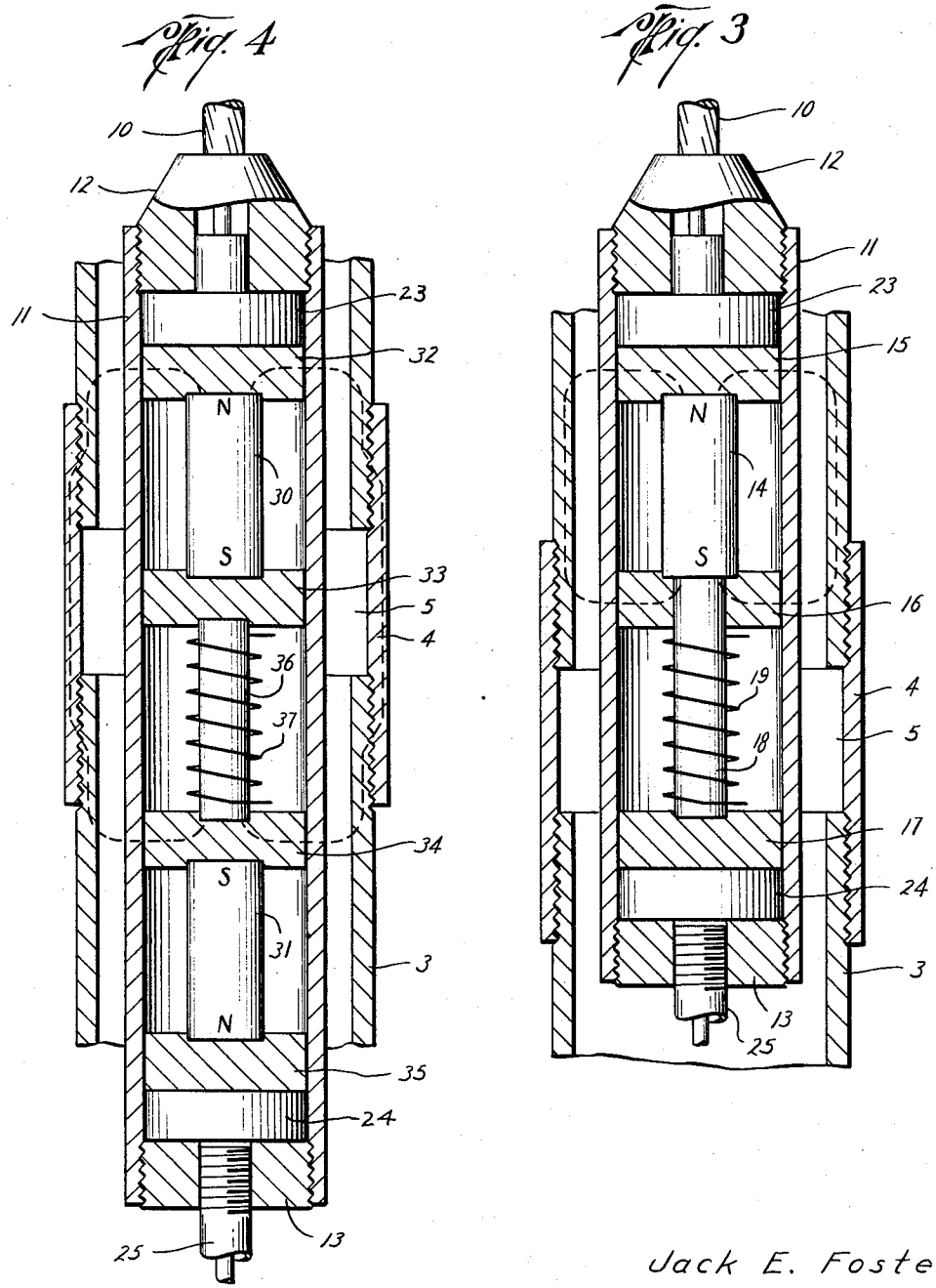

United States Patent Office 2,902,640
Patented Sept. 1, 1959

2,902,640

DETECTION OF STUCK POINT IN WELLS

Jack E. Foster, Houston, Tex.

Application December 15, 1954, Serial No. 475,383

5 Claims. (Cl. 324—34)

This invention relates to equipment and tools employed in the well drilling industry. More particularly, it deals with the use of a simple and low cost mechanism for quickly and accurately determining the stuck point in a well of a string of threaded together sections extending downwardly from the surface or ground level.

Occasionally a drill or tubing string will become stuck in a well hole at some distance below the surface, due to various causes including bore hole irregularities and formation displacement, and it becomes desirable to pull the string above the stuck point after freeing a threaded joint as close as possible to the stuck point. Difficulty has been encountered in unthreading the lowermost coupling immediately above the stuck point, and the practice has been to find or estimate the probable location of the joint and jar loose its frictionally fast thread faces by an impact or percussion force simultaneously with the application of an unthreading force applied at the upper end of the string. Percussion force in the region of the threaded sections to be uncoupled may be supplied by a hammer action directly on the string, and often is effected by firing a dynamite charge to shock the stuck thread faces.

An object of the present invention is to find the threaded coupling next above that string section which is locked fast in the well bore, through the employment of equipment capable of measurement of a slight change in the relation of interfitted threads of section couplings under torque applied on the upper end of the string, whereby the indication of the occurrence or absence of change will tell whether the threaded coupling under instant test is either above or below the stuck point.

A further object of the invention is to provide a testing device embodying a magnet to be suspended and lowered into the well bore to selected depths for indicating a threaded coupling position and bringing the threaded together parts into a magnetic field, which also includes an induction coil, whereby any change of flux resulting from a tendency toward change in thread face contact under applied torque will induce a transient current flow through the coil for measurement on a gauge at the top of the well. In this manner a reading of current flow or a lack thereof, concurrently with the application of torque on the string, shows whether the coupling threads then under test within the magnetic field are responsive to torque force and therefore above the stuck point or are below the stuck point and therefore free of applied torque. By a repetition of tests at successive coupling elevations, that coupling next above the stuck point can be quickly located for applying in the region thereof a thread loosening impact or shock for the unthreading operation.

Additional objects and advantages will become apparent during the course of the following specification having reference to the accompanying drawings, wherein Figure 1 is a vertical sectional view of a fragment of a well bore and tubing string having a stuck portion, and a somewhat diagrammatic representation of the equipment for locating the stuck point; Figs. 2 and 3 are vertical sectional views showing a magnet tool in two different positions relative to a threaded coupling of a pipe string; and Fig. 4 is a vertical sectional view illustrating an alternative embodiment of the magnet tool.

In the drawing the well bore 1 is illustrated as having a tubing string stuck fast at some point 2 below the surface. The tubing string usually comprises a large number of sections or joints 3—3 in end to end succession with adjoining ends coupled by suitable tool joints or coupling sleeves 4. The conventional coupling sleeve 4 is threaded at opposite ends and engaged with mating threads on adjoining ends of successive couplings 3—3, and the arrangement leaves a gap 5 between adjoining section ends. The gap 5, or its equivalent in other types of conventional couplings or tool joints, plays an incidental part in the practice of the present invention, as will later be explained.

The uppermost joint or string section near ground level is secured by a tool joint with a square section drive shaft or kelly 6 whose upper end is to be suspended by the traveling block of the usual derrick employed for well working operations. For rotatably driving the square section shaft 6 while accommodating its vertical adjustment upon manipulation of the traveling block, a rotary gear 7 has a square section, central opening receiving the square shaft 6 and is in mesh with a drive pinion 8 operably connected with a suitable source of power. All of the parts thus far referred to as being shown in the drawing are in regular use as oil field equipment.

When a drill or production string becomes hopelessly stuck, the practice is to abandon that portion in and below the stuck region and to salvage that string portion above the stuck point. Sometimes the mere rotation of the rotary machine 7 will unthread the string at a coupling immediately above or one reasonably close to the stuck point, but more often the thread faces are so tightly jammed together as to resist unthreading, and high twisting force applied by the rotary machine will damage the string and render it unfit for subsequent re-use. The practice is to apply an impact near the region of the coupling desired to be unthreaded so that a sharp jar will help break the bond between the thread faces and enable the threads to be backed off.

It is not always easy to locate the joint or coupling nearest the stuck point for the application of the jarring force, and the present invention is intended to provide a reliable test for indicating accurately the stuck point or, more properly speaking, the coupling which is to receive the loosening impact. For that purpose there is provided a winding drum, somewhat diagrammatically indicated at 9, for a wire line 10 by which is suspended for travel within the tubing sections a magnetic testing tool, which includes an outer shell or casing 11, preferably of nonmagnetic material such as stainless steel or Bakelite. The outer casing may conveniently be in the form of a tube or cylinder having its opposite ends internally threaded to receive an upper plug 12 and also a lower plug 13, between which are located a stack of parts including a permanent magnet.

In the embodiment shown in Figs. 2 and 3, a single magnet 14 is employed in the form of an axially extending cylinder or bar which presents its opposite poles, marked "N" and "S," in axially spaced relation. Situated against the upper or north pole end of the bar magnet 14 is a disc or pole piece 15, of soft iron, whose diameter exceeds that of the bar magnet and conforms to the internal diameter of the tube 11 so that it co-operates in providing a path in all radial directions for magnetic lines of force. A similar pole piece 16, in axially spaced relation to the disc 15, seats against the lower or south pole of the bar magnet 14, and a third disc or pole piece 17 is contained within the housing 11 in axially spaced relation below the disc 16 and is joined to and held in spaced relation with the south pole end of the magnet 14 by means of a soft iron bar 18 extending axially of the housing 11 within an enclosed chamber between the pole pieces 16 and 17. The bar 18 constitutes the core of an induction coil afforded by helical windings of an insulated wire 19 whose opposite ends are joined in any suitable fashion in a circuit containing a microammeter or galvanometer 20 on the surface. The completion of the circuit may be by any well known means, as, for example, by conducting wires which generally form a part of the suspension wire line 10 used for various types of well working operations, and accordingly Fig. 1 shows a galvanometer connected by conductors 21 and 22 leading to brushes for engagement with contact rings forming a part of the drum assembly 9. A cushion insert or pad 23 is inserted between the uppermost plug 12 and the pole piece 15, and a similar cushion pad 24 is interposed between the lowermost plug 13 and the pole piece 17, and these cushions co-operate in relieving the parts from shock strain, such as that resulting from the operation of a conventional impacting device for breaking the frictional bond of the thread faces. Such tool may be suspended by a wire line 25 secured to the lower plug 13 and of a length to locate the impacting device at a known distance below the magnetic tool. Thus, after determination of the location of the threaded joint to be loosened, the winding reel 9 can pay in a given length of cable for the subsequent operation of the impacting device.

In the use of the magnetic finder, the suspension wire 10 will be payed out a calculated distance according to a guess or estimate of the approximate location of the stuck point. At any point or position of the magnet wherein the pole piece 16 is out of alignment with any gap 5 between adjacent ends of succeeding tubing sections, the lines of force in the magnetic field will flow substantially as indicated by broken lines in Fig. 3, between the upper pole piece 15 and the pole piece 16 through the proximate wall of the tubing string. In that event, no current is induced in the coil 19, and the galvanometer will so indicate. On the other hand, when the pole piece 16 is aligned with the gap 5, as illustrated in Fig. 2, the lines of force will follow an easier path between the pole pieces 15 and 17 and through the coupling sleeve 4 and the contacting thread faces of the joint. The field is indicated by the broken lines in Fig. 2, and since the magnetic field includes the core 18, an induced current in the coil 19 will be registered on the galvanometer 20 as the flow path is established. With that indication, torque on the upper end of the string can be applied by the rotary machine 7 to affect each of the screw threaded joints occurring above the stuck point 2. The torque application can be either in the threading or unthreading direction for a tendency either to increase or decrease the pressure of thread face engagement. Although apparently no perceptible relative movement occurs in the thread faces, there does occur some change in relation of the interfitting threads, whereby the lines of force are sufficiently disturbed to affect current flow at the coil 19, and the change can be read on the galvanometer. Thus a reading which accompanies the application of torque indicates that the coupling under test responds to torque and is above the stuck point. Thereafter a readjustment of the wire line 10 for changing the position of the magnetic tool will enable a repeat test at a different coupling. When a coupling below the stuck point is under test, no response to torque application is registered. Thus by shifting the position of the testing tool the position of the lowest coupling which responds to torque can be found with a minimum of time and effort, whereupon the impacting operation may be performed for accomplishing the breaking of the joint nearest the stuck point.

In the embodiment shown in Fig. 4 the outer casing 11 encloses a pair of bar magnets 30 and 31 axially spaced apart but having like poles facing one another. Soft iron discs or pole pieces 32 and 33 engage opposite ends of the magnet 30. Similar pole pieces 34 and 35 are in contact with opposite ends of the magnet 31. The space between adjacent pole pieces 33 and 34 is bridged by an armature or core 36 within the coil 37 whose opposite ends are electrically connected with a galvanometer at the surface. Cushion pads of rubber or the like at opposite ends of the stack of parts hold them in end to end relation within the casing and absorb shock.

In this instance, when all pole pieces are out of alignment with any gap 5, the lines of force from the upper magnet 30 pass between the pole pieces 32 and 33 through the wall of the tubing string, and similarly the magnetic lines of force of the lower magnet 31 pass through the wall of the string between the pole pieces 34 and 35, and the coil 37 is inactive. However, when the tool is positioned as shown in Fig. 4 so that the pole piece 33 comes into the region of the gap 5, the pole piece 33 no longer carries lines of force directly from the tubing string wall, and the field of magnetic lines of force is established through the coupling threads and the coupling into the pole piece 34 and upwardly through the core 36. A momentary current surge is induced at the coil 37 and indicates that the test equipment is conditioned for the torque applying operation and a coupling thread response reading. If the particular threaded coupling in the magnetic field is above the stuck point, the application of torque imposes rotary strain tending to loosen or tighten thread face contact, and the resulting upset of magnetic flux produces a readable change in current flow at the galvanometer as an indication that the pipe coupling is above the place where the pipe is lodged tight. No response at the threads to torque force gives no current record, and indicates that the coupling is below the stuck point. Similarly, should the pole piece 34 come into alignment with the gap, the field or path of magnetic flow is shunted to the pole piece 35 and through the coil core 36, and the induced flow of current is reversed. The use of a pair of spaced magnets is preferred for certain uses, and it extends the working length of the tool and may enable a quicker and more noticeable signal.

From the above description it will be seen that the structure involved is free of complications and may be easily and quickly produced from readily available materials and that its use enables an easy determination of elevation of the threaded coupling next above the stuck point to facilitate subsequent impact and disconnection of the string close to the stuck point.

While the foregoing description has been specific to the preferred embodiment of the invention, it will be understood that various changes may be made such as come within the scope of the appended claims.

What is claimed is:

1. Well tool equipment for locating the stuck point of a string of sections connected in end to end succession by threaded coupling sleeves with gaps between adjoining ends, comprising torque applying means operable on the upper end of the string to vary thread face engagement in those coupling sleeves above the stuck point, a permanent bar magnet for travel in the well, a pair of axially spaced pole pieces which extend laterally outwardly beyond the permanent bar magnet and when neither is aligned with said gaps establish the path of the magnet field through said laterally extended pole pieces and the string wall portion aligned with the axial space between the pole pieces, a third pole piece axially spaced from one of the pole pieces of said pair to establish an axially extended magnetic field from the other of said pair of pole pieces and through said thread face engagement when said mentioned one pole piece is alined with and shunted by said gap from the direct path of magnetic lines of force between the intervening wall ends of sleeve coupled adjoining string sections, a coil having a core electrically connecting the third and the mentioned one pole pieces as part of the last mentioned magnetic field, and an indicator connected with said coil to indicate induced current flow and changes in magnetic force through said thread face engagement as may result above the stuck point from the operation of said torque applying means.

2. Well equipment for finding the stuck point of a string of tubing sections joined by threaded coupling sleeves arranged to define gaps between adjoining section ends, said equipment including a magnet having axially spaced pole pieces, an inductor coil having a core connecting the magnet to one of said pole pieces, means to indicate current flow in said coil, a third pole piece interposed between the last mentioned pole piece and said magnet to shunt the magnet field from said core, means to suspend the magnet for travel to selected positions in the tubing string with the adjacent wall of the sections and sleeves in the magnetic field, said field being completed through the third pole piece when the same is positioned by the suspension means out of alignment with any of said gaps and being completed through said core when the third pole piece is aligned with any of said gaps and the gap space introduces more resistance to the lines of force than does the longer path through the coupling sleeve between the first mentioned pole pieces, and torque applying means operative on the upper end of the string to modify coupling sleeve thread face engagement above the stuck point for producing a surge in coil induced current flow whenever the magnetic field includes a coupling thread above the stuck point.

3. In a well tool for locating the stuck point of a sectional string, a tubular casing having end closure walls for connection with a wire suspension line, a bar magnet and a coil core in end to end seating engagement within the casing, a pair of disc pole pieces in seating engagement respectively with the remote ends of the magnet and the core and a pair of axially spaced shock absorbent cushion pads of elastic deformable material interposed between said pole pieces and the casing opposite end closure walls, said cushion pads co-operating with one another for yieldably suspending both ends of the encased parts in stack seating engagement.

4. Equipment for use with a stuck string of well tubing sections joined in end to end succession by external coupling sleeves, each screw threaded at opposite ends about adjoining wall ends of successive tubing sections to leave an internal gap therein between the coupled tubing wall ends, comprising torque applying means engageable with the upper end of the tubing string and operable to vary thread tooth contact at each coupling sleeve above the stuck point in response to the application of torque of such magnitude as not to stress unduly the tube section walls between the coupling sleeves, a well string receiving permanent magnet having axially spaced apart primary pole pieces each of which terminates close to the sectional tubing wall for inclusion thereof within the field of the magnet centered therein, one of the pole pieces being of an axial dimension less than the axial dimensions of the coupling sleeve gaps for the presentation of resistance to the completion of the magnet field through the pole piece as the latter is brought into alignment with any gap, a secondary pole piece having a terminal for close presentment to the sectional tubing wall in axially spaced relation with said one of the pole pieces and which secondary pole piece is shunted from the magnetic field except when the said one of the pole pieces is aligned with a gap and presents a greater resistance path for the lines of force than does the secondary pole piece, a current inducing coil surrounding said secondary pole piece and a current indicator in circuit with the coil, the completion of the magnetic field through said secondary pole piece giving an initial current surge in the coil upon alignment of the said one pole piece with a coupling sleeve gap and then giving an indication of whether the magnetic field through the coupling sleeve thread contact is disturbed in response to the operation of said torque applying means.

5. The method of locating threaded couplings immediately above and below the stuck point of a pipe in a well bore comprising placing a permanent magnet within the pipe for travel therein and for establishing through the pipe wall a flow path of magnetic lines of force between opposite poles spaced apart axially a distance in excess of the length of the threaded together pipe coupling portions and with a flow change sensing armature coil positioned with the armature thereof in a portion of said flow path and connected to a surface located indicator, imparting travel of the magnet through the pipe and successively past the threaded pipe couplings for determination of coupling locations through indicator readings of flow of magnetic lines of force through the thread bearing surface of the respective couplings as each is spanned at any instant by the spaced apart magnet poles and imparting torque force to the upper end of the pipe concurrently with the spanning of any threaded coupling by the spaced apart magnet poles for response to such torque force only at the thread bearing surface of each coupling above the point at which the pipe is stuck, such thread surface response to torque or a non-response, as the case may be, changing or leaving unchanged the resistance to magnetic force between the poles as different threaded couplings are brought successively in to the flow path and comparing indicator readings of resistance change and no change at neighboring threaded couplings as showing the location of the stuck point between such neighboring couplings.

References Cited in the file of this patent
UNITED STATES PATENTS

| | | |
|---|---|---|
| 2,558,427 | Fagan | June 26, 1951 |
| 2,686,039 | Bender | Aug. 10, 1954 |
| 2,698,920 | Gieske | Jan. 4, 1955 |
| 2,717,039 | Gieske | Sept. 6, 1955 |